United States Patent
Balsells et al.

[11] Patent Number: 6,050,572
[45] Date of Patent: Apr. 18, 2000

[54] ROTARY CARTRIDGE SEALS WITH RETAINER

[75] Inventors: Peter J. Balsells, Santa Ana; John Schroeder, Orange, both of Calif.

[73] Assignee: Bal Seal Engineering Company, Inc., Santa Ana, Calif.

[21] Appl. No.: 09/037,324

[22] Filed: Mar. 9, 1998

[51] Int. Cl.[7] ........................................... F16J 15/32
[52] U.S. Cl. ............................................. 277/551; 277/572
[58] Field of Search ...................... 277/372, 551, 277/570, 572, 576

[56] References Cited

U.S. PATENT DOCUMENTS

| | | | |
|---|---|---|---|
| 1,950,852 | 3/1934 | Kuehn et al. | 277/372 |
| 2,568,056 | 9/1951 | Corder. | |
| 3,037,781 | 6/1962 | Peras. | |
| 3,188,098 | 6/1965 | Skinner, Sr. | 277/570 |
| 3,658,395 | 4/1972 | Hallerback. | |
| 3,829,106 | 8/1974 | Wheelock | 277/570 |
| 4,053,166 | 10/1977 | Domkowski. | |
| 4,240,643 | 12/1980 | Becker et al.. | |
| 4,335,887 | 6/1982 | Benassi. | |
| 5,062,648 | 11/1991 | Gomringer. | |
| 5,490,731 | 2/1996 | Scharf et al.. | |
| 5,797,602 | 8/1998 | Less | 277/372 |
| 5,813,676 | 9/1998 | Antonini et al.. | |
| 5,855,375 | 1/1999 | Wilcox et al.. | |

*Primary Examiner*—Chuck Y. Mah
*Assistant Examiner*—John L. Beres
*Attorney, Agent, or Firm*—Walter A. Hackler

[57] ABSTRACT

A rotary cartridge seal is provided which includes a cold flowable plastic ring having a body for sealably engaging the housing bore and a lip for sealably engaging a shaft rotating within the housing bore. A separable metal retainer is provided for fixing the plastic ring within the housing bore and around the shaft with the separable metal retainer having a surface of revolution with a rear portion having a radius suitable for press fitting into the housing bore and a front portion of lesser diameter ending therein. An internal groove is provided into the plastic ring body for engaging the ring therein in order to latch the plastic ring and the metal retainer together with residual stress in both the axial and radial directions within the plastic ring due to groove and ring dimensions and shape.

14 Claims, 2 Drawing Sheets

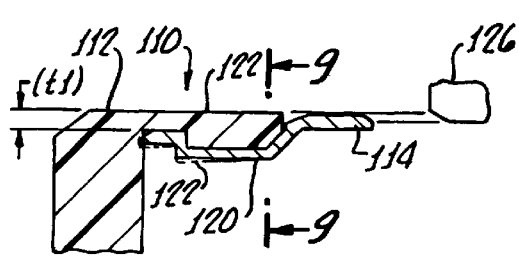
_FIG. 7._
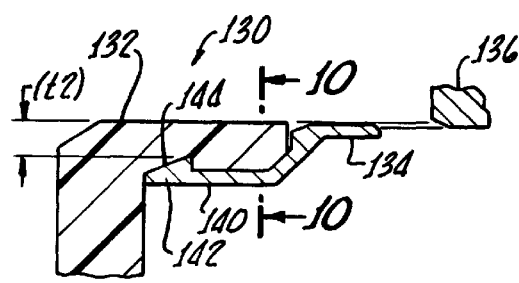
_FIG. 8._
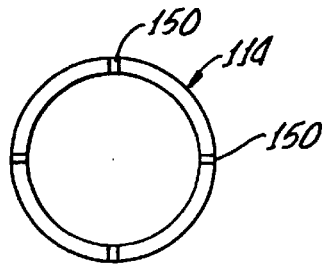
_FIG. 9._
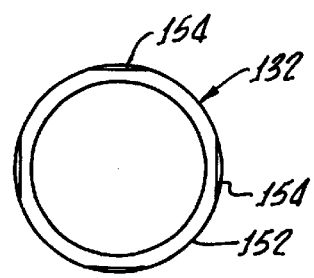
_FIG. 10._
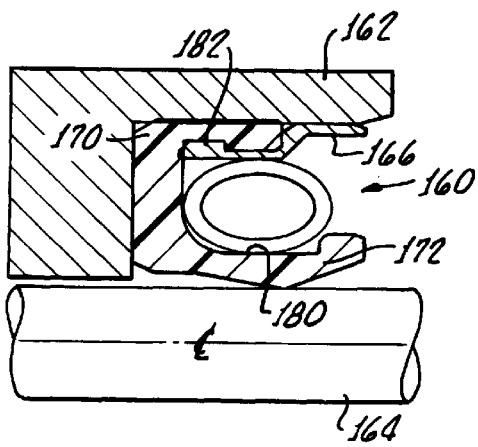
_FIG. 11._
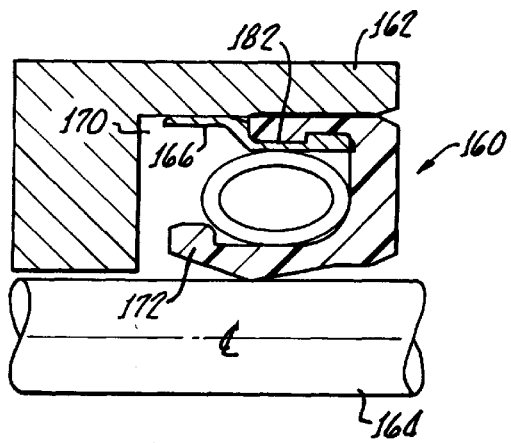
_FIG. 12._

ROTARY CARTRIDGE SEALS WITH RETAINER

The present invention generally relates to cartridge rotary seals that are pressed into a housing and provide a seal around a shaft at relatively low pressures under various fluid environments. More particularly, the present invention is directed to cartridge seal utilizing a separate metal retaining ring which provides axial and radial stress within a plastic sealing ring.

Cartridge rotary seals have been used for many years in a variety of applications for the sealing of various types of fluids and gases. Generally these seals have employed various elastomers which are encased in metal. Typical materials utilized include various plastics and fluor polymers, for example, polytetrafluoroethylene, PTFE, because they exhibit relatively low friction, are chemically inert, and can withstand a variety of temperatures, thus enabling their use under conditions with no lubrication.

Such prior art cartridge seals utilize the elastomer in a bonded relationship with a circular metallic ring which often is U-shaped. The metallic portion of the seal is pressed into a housing while the elastomeric seal bears around the shaft.

As hereinabove noted, when plastics are utilized, such as fluoropolymers, the plastic is bonded to the metallic ring and the entire assembly is pressed into the housing with a degree of interference between the OD of the seal and the housing to permit retention of the seal assembly into the housing at the same time provides static sealing against the housing. Dynamic sealing between the seal and the shaft is provided by the elastomer contact therewith.

A common problem with these seals is improper bonding between the plastic and the metal which, when subjected to heat chemical attack and elevated temperature, can cause seal failure.

The present invention provides for a rotary cartridge seal including a separate plastic ring and retainer which are uniquely locked together in order to provide a residual force therebetween in order to maintain the components together within specific temperature parameters.

SUMMARY OF THE INVENTION

A rotary cartridge seal in accordance with the present invention generally includes a cold flowable plastic ring having a body for sealably engaging a housing bore and a lip for sealably engaging a shaft rotating within the housing bore. Importantly, as hereinafter discussed in greater detail, the usable plastic material must be cold flowable, such as, for example, polytetrafluoroethylene, PTFE. Compositions of PTFE and UHMW (ultra high molecular weight polyethylene). The use of these materials enable appropriate cold flow plastic to maintain radial and axial stability of the plastic ring between the housing and the shaft.

A separable metal retainer provides means for fixing the plastic ring within the housing bore and around the shaft. The separable metal retainer includes a surface of revolution with a rear portion having a diameter suitable for press fitting into the housing bore and a front portion of lesser diameter ending in a ring.

An internal groove is provided in the plastic ring body for engaging the metal ring therein in order to latch the plastic ring and metal ring together with a residual stress in both axial and radial directions in the plastic ring body. This residual stress is created and maintained by a specific groove and ring dimensions and shape. For example, as will be hereinafter discussed in greater detail, plastic rings, in accordance with the present invention, have a relatively thick rear portion which enables a radial stress to be maintained therein. This stress is sufficient to maintain coupling between the plastic ring and the metal ring. When a plastic ring having a relatively thin rear portion is utilized, radial stress is maintained therein by specific configuration of the metal ring.

More particularly, the plastic ring internal groove has a diameter greater than the ring and the metal retainer front portion adjacent the ring has an outside diameter less than a contacted inside diameter of the plastic ring body adjacent the internal groove in order to maintain the radial stress in the plastic ring body.

Further, a width of the groove may be greater than a width of the metal ring but less than a width necessary to accept excess plastic forced by the radial stress due to cold flow into the groove means, thereby maintaining the axial stress in the plastic ring.

Additional features may include head means, disposed at an end to the lip means, for engaging the shaft and a second groove may be provided adjacent the lip means in which a spring may be disposed for biasing the lip means against the shaft. Additionally, the metal retainer may include a radially inward extending step for facilitating separation of the metal ring from the housing bore along with the plastic ring.

In addition, the plastic ring may include flat portions on an outside surface, or circumference thereof, for restricting rotary motion of the plastic ring within the housing as the shaft is rotated.

Still more particularly, the internal groove may be generally rectangular with a rectangular or dovetail sidewall facing a rear side ring for enabling "cold flow" of plastic material thereinto.

In addition, in one embodiment of the present invention, the metal retainer forward portion may include a thin cross section for providing a radial force on the plastic ring body means in order to cause radial stress therein. In this embodiment, the plastic ring has a relatively thin body portion.

Still more particularly, in this last mentioned embodiment, the forward portion of the metal retainer include longitudinal grooves on the inside surface thereof for providing enhanced radial stress in the plastic ring body.

BRIEF DESCRIPTION OF THE DRAWINGS

The advantages and features of the present invention would be better understood by the following description when considered in conjunction with the accompanying drawings in which:

FIG. 7 is a cross sectional view of another embodiment of the present invention illustrating the application of radial stress in the plastic ring;

FIG. 8 is a cross Section view of yet another embodiment of the present invention showing a ring portion in the metal retainer having a generally arrow shaped cross section;

FIG. 9 is a view taken along the line 9—9 of FIG. 7 showing longitudinal slots in the metal retainer;

FIG. 10 is a view taken along the line 10—10 of FIG. 8 showing flat portions on a forward portion of the plastic ring to prevent rotation thereof within the housing;

FIG. 11 is yet another embodiment of the present invention illustrating the use of a spring disposed within the plastic ring for biasing the lip and bearing against the metal retainer; and FIG. 12 is another illustration of the embodiment shown in FIG. 11 showing its ability to be disposed between the housing and the shaft in a reversed direction.

DETAILED DESCRIPTION

Figure 1:
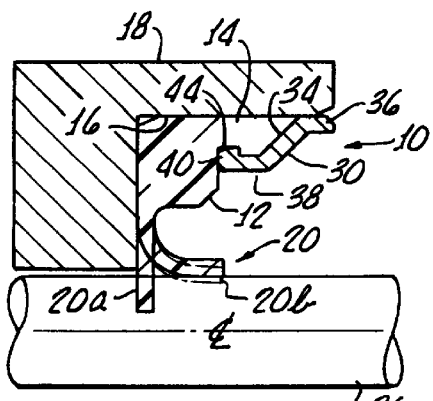
FIG. 1 is a cross sectional view of one embodiment of the present invention showing a rotary cartridge seal disposed between a housing and a shaft with the seal generally including a plastic ring with a separable metal retainer for fixing the plastic ring within the housing and around the shaft.

Turning now to FIG. 1 there is shown a rotary cartridge seal 10 in accordance with the present invention which generally includes a cold flowable plastic ring 12 having a body 14 which provides means for sealably engaging a housing bore, formed in the housing 18, and a lip 20 which provides means for sealably engaging a shaft 26. In FIG. 1 the lip 20 is shown in dashed line 20A in a position before seal 10 is inserted between the housing 18 and shaft 26 and the dashed line 20b represents an effective range of sealing for the lip 20.

Importantly, the present invention utilizes a cold flowable plastic material, such as PTFE, PTFE compositions with various fillers or UHMW, to enable the flow of the material when properly stressed as in accordance with the present invention. In fact, the residual stress maintains the plastic ring in intimate contact with a separable metal retainer 30 in a manner which creates residual stress for maintaining the components together within specific temperature parameters.

No permanent bonding occurs between the plastic ring 12 and the metal retainer 30, with the latter providing a means for retaining the plastic ring within the housing bore 16 and around the shaft 26. As shown, the separable metal retainer 30 includes a surface of revolution 34 having a rear portion 36 with a diameter suitable for press fitting into the housing bore 16 and a front portion 38 having a lesser diameter which ends in a ring 40.

Figure 2:
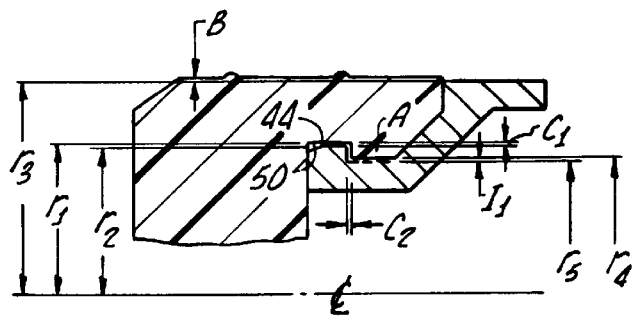
FIG. 2 is an enlarged cross sectional view of a portion of the embodiment shown in FIG. 1 showing greater detail of the engagement between the metal retainer and the plastic ring.

An internal grove 44 within the plastic ring body 14, as more clearly shown in FIG. 2, has a radius $r_1$ greater than a ring radius $r_2$, resulting in a clearance $C_1$. Such clearance facilitates assembly of the metal part into the plastic groove. The metal ring front portion 38 adjacent the ring 40 has an outside radius less than a contacted inside radius of the plastic ring body 14 indicated as interference $I_1$, in order to maintain the radial stress in the plastic ring body 14.

In addition, a width of the groove 44 is greater than a width of the ring as indicated by the clearance $C_2$. Such clearance facilitates assembly of the two parts. However, upon insertion of the seal 10, between the housing 18 and the seal O.D. 12, causes cold flow of the PTFE into the groove 44 and around the ring 40 creating an axial stress in the plastic ring 12. This deformation force can be applied radially, axially or a combination of radial axial forces with the purpose of providing locking action between the plastic ring 12 and the metal retainer 30.

Depending upon the wall thickness of the plastic ring 12, additional radial loading may be provided by the metal retainer 30 so as to exert added axial spring like force to maintain greater and longer intimate contact between the plastic ring 12 and the housing 18. As hereinafter described in greater detail with regard to other embodiments of the present invention, seals in accordance with the present invention provide sealing throughout a greater temperature range. The metallic retainer 30 may be designed to add flexibility and increase the loading force as the temperature increases and the bearing stress of the PTFE decreases. In this manner a spring force provided by the metallic retainer 30 maintains an improved sealing ability of the cartridge seal 10 while maintaining contact between the seal OD and the housing 18.

The groove 44 in the plastic ring body 14 and the ring 40 portion of the metal retainer 30 is assembled as a rotary cartridge seal 10 by forcing the metal retainer 30 into the plastic ring 12 which expands the plastic ring 12 radially and causes the plastic ring 12 to "snap" which creates a diametrical interference between the ID of the plastic ring 12 and the OD of the metal retainer 30 at an area A so that a residual circular stress remains.

In this instance, "snap" refers to the radial and/or axial expansion of the plastic which allows plastic to return to its normal position but creates a radial or axial residual stress around the expanded surfaces.

Upon assembly of the plastic ring 12 and metal retainer 30 into the housing bore 16 and over the shaft 26 causes a diametrical force, as hereinabove noted, to be applied on the plastic ring 12. Interference between the OD of the plastic ring 12 and the housing bore 16 provides a radial load on the plastic ring 12 for maintaining intimate contact between the OD of an area A of the metal retainer 30 and the plastic ring 12.

Inasmuch as this interference adds to stress, which is maintained between the two surfaces, the metal retainer 30 and plastic ring 12 are locked both axially and radially. Excess plastic flows around the outside radius $r_3$ of the plastic seal which creates an interference with the housing indicated at B in FIG. 2. In addition, this cold flow, enabled through the use of PTFE, causes filling of the clearance $C_2$ and gap between the ring 40 and the groove 44 to provide axial stress and positive latching or locking of the metal retainer 30 and the plastic ring 12. Naturally, in this regard, proper spring-like metal retainer 30 material must be utilized, such as, for example, preferably stainless steel.

It should be appreciated that the plastic ring 12 and the metal retainer 30 may be locked in place by either an axial locking action, a radial locking action or a combination of both. That is, there may be axial clearance at assembly, which may or may not be filled by the cold flowing of the material, as in $C_2$, FIG. 2, or radial clearance at assembly as in $C_1$ and such clearance may remain or may not remain after cold flow of the material. But in all cases, there will be some sort of residual induced stress, be axial, radial, or a combination of axial and radial.

More specifically, and by way of example only, the plastic PTFE ring may have an outside radius of between about 19.000 mm and about 19.126 mm with a housing having a radius between about 19.063 mm and about 19.037 vacating a radial interference ranging between about 0.089 mm–0.0035" to about 0.063 mm–0.0024".

The plastic ring groove may have a radius of $r_1$ between about 17.907 mm and about 17.882 mm with a metal ring groove diameter $r_2$ of between about 17.832 mm and about 17.356 mm having a radial clearance between about 0.000 mm to about 0.051 mm.

The plastic ring groove radius $r_5$ may have a radius of between about 17.526 mm and about 17.500 mm with a metal ring radius $r_4$ of between about 17.597 mm and about 17.551 mm having a radial interference between about 0.092 mm to about 0.025 mm.

In addition, the difference between the groove 44 width and ring 40 width may provide for clearance $C_2$ of between about 0.000 mm and about 0.051 mm.

This configuration enables sealing between the housing 18 and the shaft 26 at temperatures between about –20° C. and about 100° C. at shaft rotational speeds of up to 5000 RPM, when using PTFE compositions, as for example, containing 20% carbon, 5% graphite, 78% PTFE.

Figure 3:
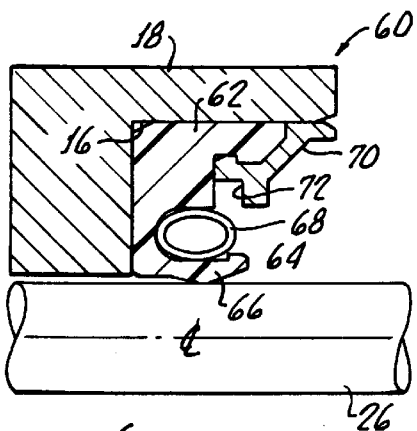
FIG. 3 is a cross sectional view of yet another embodiment of the present invention in which a spring is disposed in a position for biasing a lip of the plastic ring against a shaft and a metal retainer includes a step for facilitating separation of the metal retainer from the housing bore.

Another embodiment 60 in accordance with the present invention is shown in FIG. 3 in which plastic ring 62 includes a second groove 64 adjacent a lip 66 is provided for receiving a spring 68 for biasing the lip 66 against the shaft 26.

In addition, a metal retainer 70 which is similar in design to the retainer 30 but which includes an inwardly extending step 72 which provides means for facilitating separation of the metal retainer 70 from the housing bore 16 along with the plastic ring 62.

Figure 4:
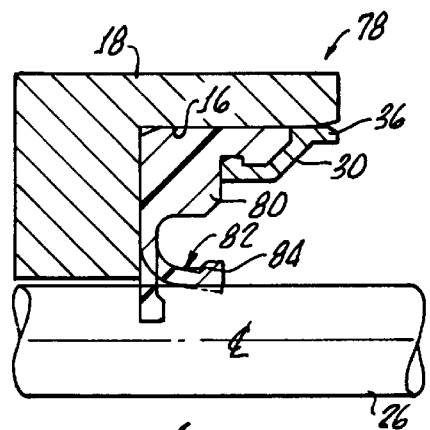
FIG. 4 is another embodiment of the present invention similar to that shown in FIG. 1, but with the plastic ring having a lip thereon with an enlarged head portion.

A further embodiment 78 of the present invention is shown in FIG. 4 in which common character references refer to identical or substantially the same elements shown in FIG. 1. In this embodiment 78, a plastic ring 80 includes a lip portion 82 having a head 84 thereof which provides a means for contacting the shaft 26 over a greater area.

Figure 5:
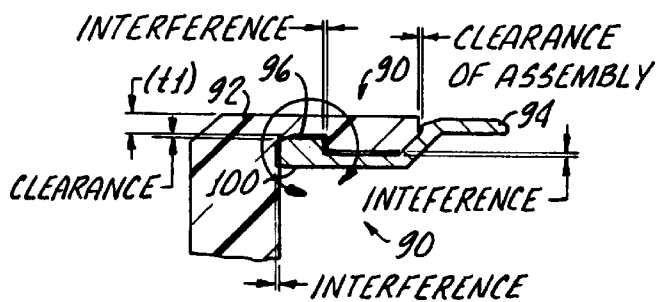
FIG. 5 is a cross sectional view of yet another embodiment of the present invention in which the plastic ring includes a thin forward portion and radial stress, as hereinafter discussed in greater detail, is provided by an extended or cantilever portion of the metal ring.

Turning now to FIG. 5, yet another embodiment 90 in accordance with the present invention includes a plastic ring 92 and a metal retainer 94. In this instance, the plastic ring 92 includes a relatively thin wall thickness $t_1$, and accordingly no radial snapping action occurs due to the flexibility of the plastic ring 92 at that point. However, snapping action occurs axially as hereinabove described in accordance with the embodiments shown in FIGS. 1–4.

In the rotary cartridge seal embodiment 90 shown in FIG. 5, the ID of the plastic ring 92 expands radially during assembly which allows partial entry of the metal retainer 94 into the plastic ring groove 96. Sufficient force is applied axially which causes axial deformation of the plastic ring 92 at the groove 96, that creates an axial snap action by compressing and deforming the plastic ring 92 axially around the groove 96 area.

The axial deformation of the plastic ring 92 causes a residual stress that maintains axial as well as radial contact with the groove 96 in order to lock the plastic ring 92 in the metal retainer 94 together. This configuration adds to reliability and ability of the seal 90 at higher temperatures through the combined axial and radial residual stresses that remain in the plastic ring 92.

Figure 6:
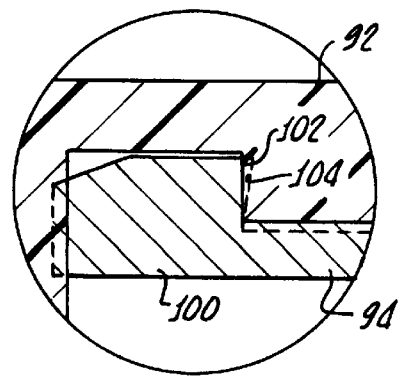
FIG. 6 is an enlarged cross sectional view taken along the line 6—6 of FIG. 5 showing a groove and dovetail arrangement for facilitating cold flow of plastic material.

The groove ring 100 on the metallic retainer 94 may be dovetailed as shown in FIG. 6, or it may be squared. A dovetailed design facilitates assembly of the metal ring 94 into the plastic ring 92. In addition, the dovetail 102 as well as a corresponding dovetail 104 in the plastic ring 92 enables a greater amount of cold flowing of the PTFE material of the ring 92 into the area therebetween. This provides for more substantial locking of the plastic ring 92 and the metal retainer 94.

Referring to FIG. 7, another rotary cartridge seal embodiment 110 in accordance with the present invention which is similar in design to the seal 10 hereinabove discussed in connection with FIG. 1.

A plastic ring 112 is provided as well as a metallic retainer 114. However, in this instance, a metal retainer 114 is thin-walled. The metal retainer 114 includes a long cantilever front portion 120 which magnifies radial deflection thereof as indicated by the dashed line 122 in FIG. 7. This added spring deflection increases the radial load on the body portion 122 of the plastic ring 112 which provides additional force in addition to the residual force that already exists so that the seal assembly 110 can be used at higher temperature.

The circular deflection of the metal retainer 114, is sufficient to maintain intimate contact between the OD of the plastic ring 112 and the metallic retainer 114. It should be appreciated that the residual stress that occurs radially and axially during assembly decreases as the temperature increases. Accordingly, this added radial spring force, caused by the thin section cantilever 122, takes up such loss of residual stress at elevated temperatures and permits the seal assembly to operate at higher temperatures due to such added radial deflection. The seal assembly 110 is pressed and retained into a housing 126 by interference that occurs between the metal ring OD and the housing 126.

FIG. 8 shows a further rotary cartridge seal embodiment 130 in accordance with the present invention including a plastic ring 132 and metal retainer 134 for insertion into a housing 136. A thin cantilever section 140 of the metallic retainer 132 is provided with an arrowhead shaped head 142, which is forced into intimate contact with a correspondingly shaped groove 144 to create axial locking between the plastic ring 132 and the metal retainer 134. The arrowhead 142 may have a dovetail design as shown in FIG. 6 to improve locking action. Radial interference is provided between the seal OD and the housing 136 to improve seal performance.

Improved flexibility of the cantilever portion 120 of the metallic retainer 114 shown in FIG. 7 may be obtained by providing longitudinal slots 150 as shown in FIG. 9. Slots 150 provide for added deflection and hence greater flexibility of the metal retainer 114 in order to accommodate larger temperature ranges as may be desired.

Further, as shown in FIG. 10, the plastic ring 132 may include a plurality of flats 154 on a circumference 156 in order to prevent rotation of the plastic ring 132 during operation. As hereinabove noted, the cold flow characteristics of the PTFE material utilized in the ring 132 enable material to flow into the flats thereby preventing rotation of the plastic 132.

Yet another embodiment 160 of the present invention is shown in FIGS. 11 and 12. The rotary cartridge seal 160 design enables the cartridge seal 160 to be inserted and utilized between a housing 162 and shaft 164 in opposite directions as are correspondingly represented in FIGS. 11 and 12. A metal retainer 166 is similar to the retainer hereinabove described in connection with retainer 30 shown in FIG. 1, and the plastic ring 170 having a lip 172 is similar in design and function to the plastic ring 62 and lip 66 as described in connection with FIG. 3. In this instance, a plastic ring 170 is U-shaped and a spring 180 is disposed therein between a lip 172 and the metal retainer 166 with the spring 180 being disposed in the position bearing against a metallic retainer front portion 182. This configuration provides for increased sealing ability.

It should be noted that sealing lip designs indicated in FIGS. 1 and 4 may be used in place of the designs indicated in FIGS. 11 and 12.

It should be appreciated that the hereinabove discussed rotary cartridge seals, 10, 60, 78, 90, 110, 130, and 160 provide for an assembly that creates residual stresses to maintain intimate contact between the plastic rings and metal retainers within a specific temperature ranges, for example, between about −20° and about 100° C. Intimate contact between seal surfaces take up for variations that may occur to the PTFE material during usage especially at elevated temperatures. Specifically described dimensions and configurations with regard to clearances hereinabove discussed, control the cold flow of the PTFE material, and limit the shrinkage thereof, while maintaining residual stress in order to maintain intimate contact between the plastic rings and corresponding metallic retainers.

Although there has been hereinabove described a specific embodiment of a rotary cartridge seal in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art should be considered to be within the scope of the present invention as defined in the appended claims.

What is claimed is:

1. A rotary cartridge seal comprising:

a cold flowable plastic ring having body means for sealably engaging a housing bore and lip means for sealably engaging a shaft rotating within said housing bore;

separable metal retainer means for fixing said plastic ring within said housing bore and around said shaft, said separable metal retainer means having a surface of revolution with a rear portion having a radius suitable for press fitting into said housing bore and a front portion of lesser radius ending in a ring; and means defining an internal groove in said body means for engaging the ring therein in order to latch the plastic ring and metal retainer means together with residual stress in both axial and radial directions within the plastic ring due to the groove and ring dimensions and shape, said internal groove having a diameter greater than the ring and wherein a width of said internal groove is smaller than a width of the ring in order to maintain axial stress in the plastic ring.

2. The seal according to claim 1 wherein said internal groove has a radius greater than the ring and the metal retainer front portion adjacent the ring has an outside radius less than a contacted inside radius of the plastic ring body means adjacent said internal groove in order to maintain the radial stress in said plastic ring.

3. The seal according to claim 2 wherein a width of said internal groove is greater than a width of the ring but less than a width necessary to accept excess plastic forced by the radial stress due to cold flow into said internal groove thereby maintaining the axial stress in the plastic ring.

4. The seal according to claim 3 wherein said lip means includes head means, disposed at an end of said lip means, for engaging the shaft.

5. The seal according to claim 4 wherein said plastic ring further comprises means for defining a second groove adjacent said lip means and spring means, disposed in said second groove, for biasing said lip means against said shaft.

6. The seal according to claim 5 wherein the metal retainer means comprises radially inwardly extending step means for facilitating separation of the metal retainer means from said housing bore.

7. The seal according to claim 6 wherein the plastic ring includes means defining flats on an outside surface thereof, for restricting rotary motion of the plastic ring.

8. A rotary cartridge seal comprising:

a cold flowable plastic ring having body means for sealably engaging a housing bore and lip means for sealably engaging a shaft rotating within said housing bore;

separable metal retainer means for fixing said plastic ring within said housing bore and around said shaft, said separable metal retainer means having a surface of revolution with a rear portion having a diameter suitable for press fitting into said housing bore and a front portion of lesser diameter ending in a ring; and means defining an internal groove in said body means for engaging the ring therein in order to latch the plastic ring and metal retainer means together with residual stress in an axial direction within the plastic ring due to the groove and ring dimensions and shape, said internal groove having a diameter greater than the ring and wherein a width of said internal groove is smaller than a width of the ring in order to maintain axial stress in the plastic ring.

9. The seal according to claim 8 wherein said internal groove is generally rectangular with a dovetail sidewall facing a rear side of said ring.

10. The seal according to claim 8 wherein the metal retainer means forward portion includes means defining a thin cross section in the forward portion, for providing a radial force on the plastic ring body means in order to cause radial stress therein.

11. The seal according to claim 10 wherein the forward portion of the metal retainer means includes means, defining longitudinal grooves on an inside surface thereof, for providing enhanced radial stress in the plastic ring body means.

12. The seal according to claim 11 wherein the plastic ring includes means, defining flats on an outside surface thereof, for restricting rotary motion of the plastic ring.

13. The seal according to claim 10 wherein said plastic ring is U-shaped and further comprising spring means, disposed between said lip means and said body means for biasing said lip means against said shaft, said spring means being disposed in a position bearing against the metal retainer means front portion.

14. The seal according to claim 1 wherein said plastic ring is U-shaped and further comprising spring means, disposed between said lip means and said body means for biasing said lip means against said shaft, said spring means being disposed in a position bearing against the metal retainer means front portion.

* * * * *